United States Patent [19]
Watanabe et al.

[11] 3,778,607
[45] Dec. 11, 1973

[54] AUTOMATIC SCALING SYSTEM

[75] Inventors: Shigeru Watanabe, Hachioji; Norio Yokozawa, Futyu; Shigeru Yabuuchi, Hachioji; Ituko Terakado, Kodaira, all of Japan

[73] Assignee: Hitachi, Ltd., Tokyo, Japan

[22] Filed: Mar. 23, 1972

[21] Appl. No.: 237,268

[30] Foreign Application Priority Data
June 25, 1971 Japan................................ 46/45676

[52] U.S. Cl................................. 235/193, 235/180
[51] Int. Cl......................................... G06g 7/32
[58] Field of Search..................... 235/193, 184, 180; 444/1

[56] References Cited
UNITED STATES PATENTS
3,048,335  8/1962  Burhans et al.................. 235/180 X
3,422,257  1/1969  Jackson ............................. 235/193
3,529,143  9/1970  Hirsch................................ 235/193
3,652,843  3/1972  Kurokawa et al............... 235/193 X

OTHER PUBLICATIONS

Proctor et al.—"The Pace Scaling Routine For Mercury"—Computer Journal-Vol. 5, April 1962 –Pages 24-27.
Green et al.-"Apache – A Breakthrough In Analog Computing"– IRE Transactions on Electronic Computers-Vol. Ec 11, Oct. 1962-Pages 699-706.

*Primary Examiner*—Joseph F. Ruggiero
*Attorney*—Paul M. Craig, Sr. et al.

[57] ABSTRACT

An automatic scaling system wherein means are provided which, in the case of programming of an analog operator, numerically analyzes an original differential equation in digital form for evaluating approximate solutions for the variables of the equation and for calculating the maximum values of the respective variables from the approximate solutions. Additionally, means are provided for determining voltage scale factors from the maximum values and thus, voltage and time scalings are automatically carried out.

10 Claims, 16 Drawing Figures

$$f_i(y_1, y_2, \cdots, y_n, h_i(t)) = (k_{i1}, k_{i2}, \cdots, k_{in}) \begin{pmatrix} y_1 \\ y_2 \\ \vdots \\ y_n \end{pmatrix} + h_i(t)$$

$$f_i'(Y_1, Y_2, \cdots Y_n, h_i'(t)) = (k_{i1}\frac{\beta_i}{\beta_1}, k_{i2}\frac{\beta_i}{\beta_2}, \cdots, k_{in}\frac{\beta_i}{\beta_n}) \begin{pmatrix} Y_1 \\ Y_2 \\ \vdots \\ Y_n \end{pmatrix} + k_i'(t)$$

$$h_i'(t) = \beta_i h_i(t)$$

FIG. 15

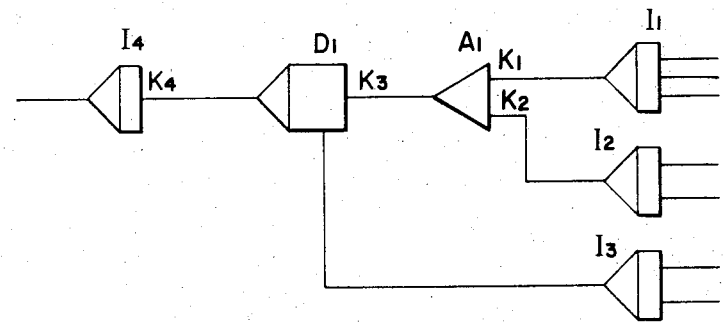

FIG. 16

| a | OPERATING ELEMENT($A_1$) | THE NUMBER OF INPUT COEFFICIENT (2) |
|---|---|---|
| b | MAXIMUM VALUE OF $A_1$ OUTPUT ($A_{1M}$) | |
| c | MAXIMUM VALUE OF $I_1$ OUTPUT ($I_{1M}$) | |
| d | INPUT COEFFICIENT OF $A_1$ ($K_1$) | |
| e | MAXIMUM VALUE OF $I_2$ OUTPUT ($I_{2M}$) | |
| f | INPUT COEFFICIENT OF $A_1$ ($K_2$) | |
| g | OPERATING ELEMENT($D_1$) | THE NUMBER OF INPUT COEFFICIENT (1) |
| h | MAXMUM VALUE OF $I_3$ OUTPUT($I_{3M}$) | |
| i | MINIMUM VALUE OF $I_3$ OUTPUT ($I_{3S}$) | |
| | INPUT COEFFICIENT OF $D_1$ ($K_3$) | |
| | OPERATING ELEMENT($I_3$) | THE NUMBER OF INPUT COEFFICIENT (1) |
| | MAXMUM VALUE OF $I_3$ OUTPUT ($I_{3M}$) | |
| | MAXMUM VALUE OF $D_1$ OUTPUT ($D_{1M}$) | |
| | INPUT COEFFICIENT OF $I_4$ ($K_4$) | |

AUTOMATIC SCALING SYSTEM

BACKGROUND OF THE INVENTION

1. Field of the Invention

This invention relates to an automatic programming system, more particularly to an automatic scaling system for the analog operator of an analog computer or hybrid computer.

2. Description of the Prior Art

In solving a differential equation by an analog computer or hybrid computer, a variety of analog operating elements are combined such that mathematical relations among the dependent variable and independent variables of the given equation may be established by voltages and time relationships in the computer, and thus, the solutions are found by recording changes in the voltages versus time.

The combining of the analog operating elements, i.e., the connection of the various analog operating elements through a patch code or switching matrix is called "programming." In the programming, saturation voltages of the respective analog operating elements are treated as 1. More specifically, these types of computers utilize the fixed point method, and should handle numerical values less than 1. Variable ranges and magnitudes of the variables of the equation to be operated, however, have various values. Scaling is therefore required in which the values of the variables are brought into correspondence to numerical values less than 1 (one).

The scaling is conducted in the form of division of each variable by its maximum value, and is generally termed "voltage scaling." According to the scaling, outputs of the various operating elements operate within the maximum allowable voltages for any variables, and highly precise solutions are obtained. Since, however, factors which may be handled by these types of computers are restricted to a certain range, the results of the voltage scaling in the form of division of the variables by their maximum values are sometimes impossible to handle in the computers in their present form. In this case, the scaling operation should be again performed so that the transformed values may be treated by the computer. Conversely, even if the equations are subjected to the scaling so as to allow them to be handled by the computer, it is not assured that the computer will work within an appropriate working range in operation.

Heretofore, the programming of these types of computers has been conducted such that the differential equation to be solved is directly subjected to the voltage and time scalings by a desk calculation, and that scale factors are determined in trial-and-error by repeating operations. Thus, a large amount of time is spent in desk works and the trial-and-error scaling operation. When a system to be operated is large and complicated, the programming is difficult, and requires a considerable amount of time. After the programming is once completed, operated results sometimes scale over or become very small in amplitude and hence, the scaling should be again conducted in some situations. For this reason, programming problems attributable to artificial errors are brought about and the time necessary to overcome such problems accounts for the greater part of the working period of time of the computer, and it is an obstacle in the use of the computer.

SUMMARY OF THE INVENTION

A principal object of this invention is to provide a scaling system which conducts scaling automatically.

Another object of this invention is to sharply reduce the time required for scaling.

Still another object of this invention is to eliminate problems due to artificial errors introduced due to scaling.

In order to accomplish such objects, this invention provides an automatic scaling system wherein approximate solutions of given differential equation are digitally evaluated, scale factors of the respective variables are determined on the basis of the evaluation and scaling is carried out using the scale factors.

These and further objects, features and advantages of the present invention will become more obvious from the following description when taken in connection with the accompanying drawings.

BRIEF DESCRIPTION OF THE DRAWINGS

FIG. 15 is a connection diagram of an embodiment of an operating block applied to the scaling unit of FIG. 14; and FIG. 16 is a chart showing the arrangement of data corresponding to the operating block in FIG. 15.

DETAILED DESCRIPTION OF THE INVENTION

Figure 1:
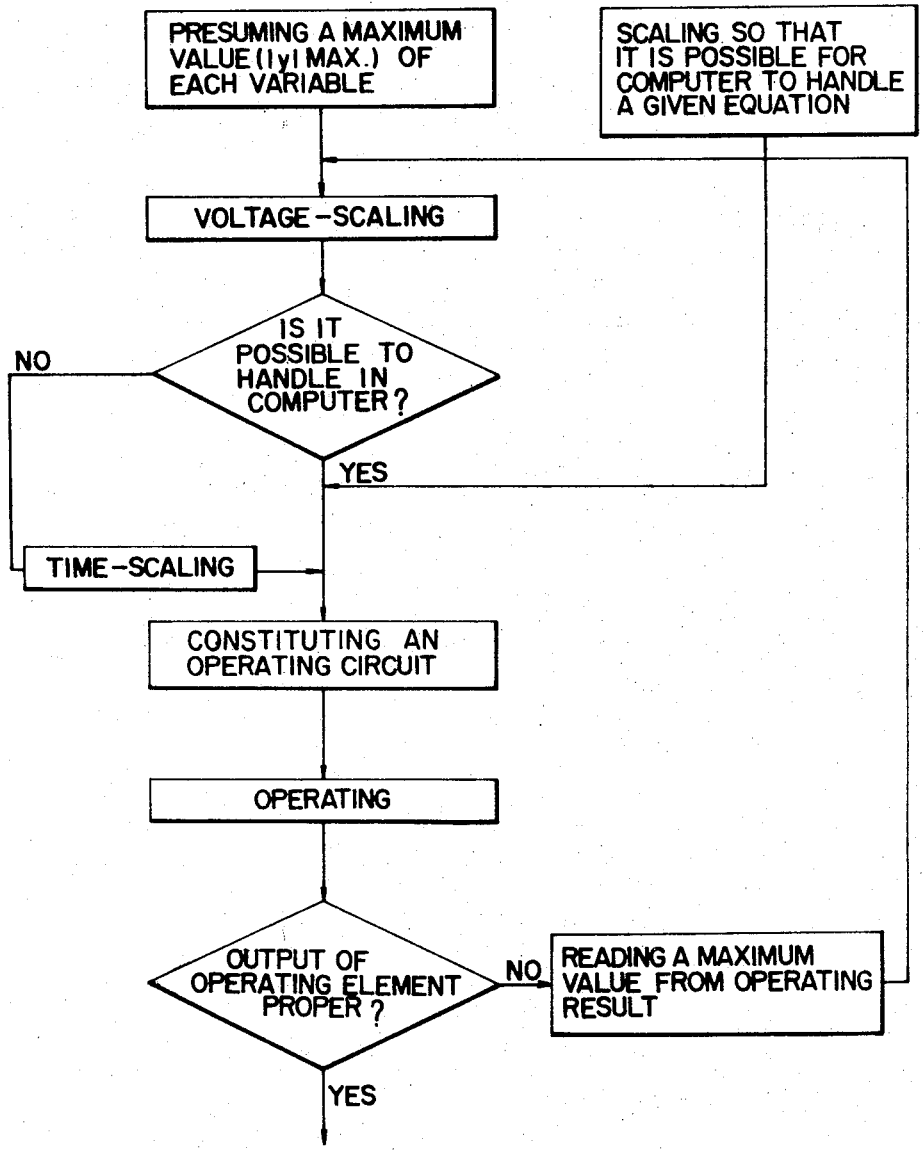
FIG. 1 is a flow chart for explaining a prior-art scaling system.

FIG. 1 shows the procedures of programming in a prior art analog operator.

At the first stage, the maximum value $|y|_{max}$ of each variable of a differential equation to be solved is presumed. Voltage scale factors $\beta_6 = 1/|y|_{max}$ are derived from the presumed values. Then, voltage scaling is conducted so that operating elements corresponding to the respective variables may work at the maximum allowable amplitudes. The operating elements are examined to determine if, as the result of the voltage scaling, the factors etc. are within a predetermined range within which they may be handled by a computer. In the case where they cannot be handled in the present form, time scaling is carried out to form an operating equation. At the second stage, an operating circuit corresponding to the operating equation obtained at the first stage is arranged. This is done by interconnecting the respective operating elements through a patch code or switching matrix. With the operating circuit thus arranged, the operation is conducted.

In this operation, it is sometimes determined that the previous presumption of the maximum values of the respective variables is unsuitable in that the outputs of the various operating elements exceed their maximum allowable amplitudes or have extremely small amplitudes. Accordingly, when the output values of the respective operating elements are unsuitable as in the above in view of the operated results, the maximum values of the respective variables are read out and voltage scaling is again carried out on the basis of the maximum values. The foregoing processes are repeated to thereby construct an operating circuit in which the outputs of all the operating elements work at the maximum allowable amplitudes.

On the other hand, in the case where the maximum values of the respective variables of a differential equation are not subject to proper estimation, the equation should be reduced through any suitable method so as to allow it to be handled in the computer. As the result of the reduction, all the numerical values in the equation are brought into a factor range within which the analog computer may handle them, and thus, operation by the computer is made possible. That is, scaling with respect to the equation is carried out. Even when the scaling operation is executed by the scaling with respect to the equation so that the variables may be handled by the computer, the computer does not always work at appropriate operating voltages. Voltage scaling and time scaling should therefore be conducted by repeating operations as in the foregoing so as to attain appropriate operating voltages or operating periods of time.

As thus far described, in accordance with the prior art programming, a differential equation to be solved is directly subjected to voltage and time scalings on the basis of desk calculations, and operations are repeated to determine scale factors in a trial-and-error procedure. Much time is therefore required for the scaling operations and problems attributable to artificial errors are often caused.

The following is a description of the principles utilized in connection with the present invention with a method for obtaining the approximate solution of a differential equation being discussed initially.

An ordinary differential equation is expressed by simultaneous differential equations of the first order as in eq. (1).

$$dy_1/dt = f_1(y1, y2, \ldots, y_n)$$
$$dy_2/dt = f_2(y1, y2, \ldots, y_n)$$
$$\vdots$$
$$dy_n/dt = f_n(y1, y2, \ldots, y_n)$$

(1)

where $y_1 = y_{10}, y_2 = y_{20}, \ldots, y_n = y_{n0}$ at $t = 0$.

Figure 2:
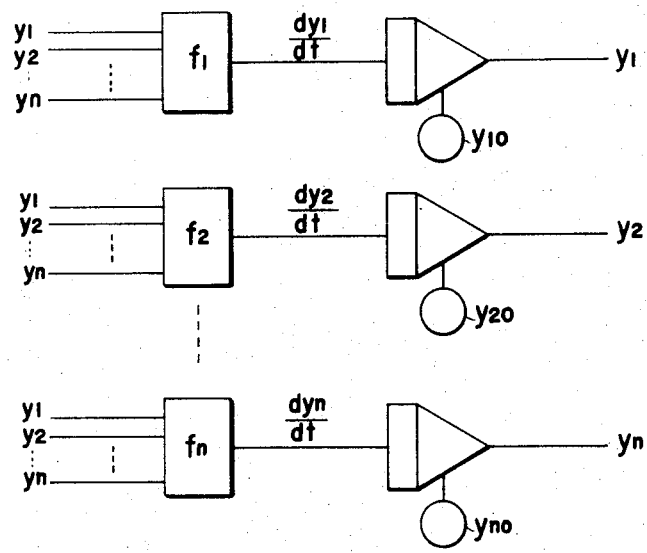
FIGS. 2 and 9 inclusive are connection diagrams of operating circuits for explaining the principle of this invention.

An operating circuit for the differential equations is illustrated in FIG. 2. However, in the following explanation, it is assumed that, unlike an actual operating circuit of a computer, the integrators in FIG. 2 conduct mere integration without inversion of signs.

An example will now be considered where $f_1, f_2, \ldots, f_n$ in the figure are expressed by linear equations of $y_1, y_2, \ldots, y_n$. When a specially fixed time is located at the origin of a time axis and the values of $y_1, y_2, \ldots, y_n$ are respectively $y_{10}, y_{20}, \ldots, y_{n0}$ at the specified time $t = 0$, values at $t = \Delta t$ are found. If the values are correctly obtained, the origin is subsequently shifted to $\Delta t$ and the same process is repeated. Thus, such values at every $\Delta t$ may be obtained in succession.

Figure 3:
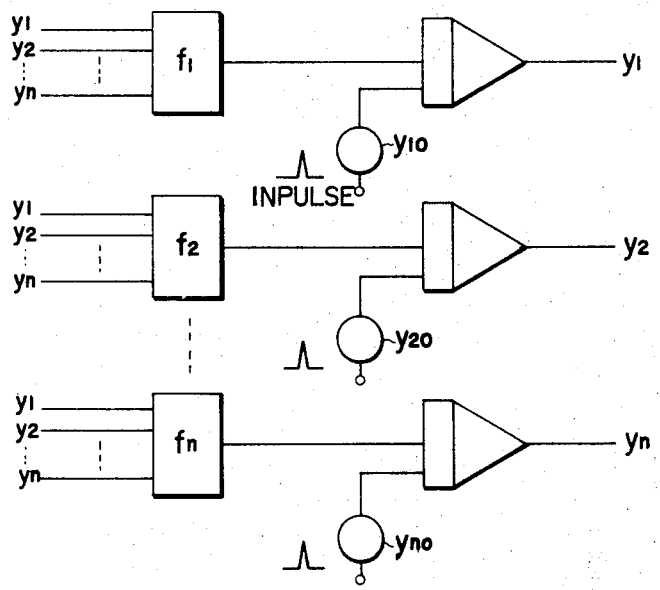

The initial values $y_{10}, y_{20}, \ldots, y_{n0}$ in FIG. 2 may be replaced with values of addition after multiplication by impulses $y_{10}, y_{20}, \ldots, y_{n0}$, as shown in FIG. 3. The impulses are passed through the integrators and the resultant outputs are fed back to the input side to be subjected to operations $f_i$ (multiplication by constants) and are passed through the integrators. The resultant outputs are again fed back to the input side and in this manner, the impulses pass through the integrators an infinite number of times. In actuality, the functions occur simultaneously. Since, however, the operations are linear, they are considered to occur in succession, and actually, outputs are evaluated as the sum thereof. In this case, the passage through $f_i$ subjects the impulses merely to multiplication by constants. An output wave form when the impulse has passed through the integrator $m$ times, therefore becomes the form of $a/s^m$ (where $a$ is a constant). The sum of outputs of the integrator $i$ as result from $m$ times of passage of the impulse through the integrator is now represented by $a_{mi}/s^m$. The sum for one time of passage through the integrator, i.e., $a_{1i}/s$, is therefore represented by eq. (2).

$$a_{1i}/s = y_{i0}/s$$

(2)

The sum for two times of passage, $a_{2i}/s^2$ may be expressed as in eq. (3) since $f$ is a linear homogeneous equation of input $y$.

$$a_{2i}/s^2 = (1/s) \cdot f_i(a_{11}/s, a_{12}/s, \ldots, a_{1n}/s)$$
$$= (1/s^2) \cdot f_i(a_{11}, a_{12}, \ldots, a_{1n})$$

(3)

In general, the sum is represented as in eq. (4).

$$a_{m+1, i}/s^{m+1} = (1/s^{m+1}) \cdot f_i(a_{m1}, a_{m2}, \ldots, a_{mn})$$

(4)

That is, the sum may be expressed as in eq. (5).

$$a_{m+1, i} = f_i(a_{m1}, a_{m2}, \ldots, a_{mn})$$

(5)

The outputs for $m$ times of passage through the integrator are inverse-transformed into time regions, and $t = \Delta t$ is substituted. Assuming the result is to be $b_{mi}$, then eq. (6) is obtained.

$$b_{mi} = \alpha^{-1}[a_{mi}/s^m] = [\Delta t^{m-1}/(m-1)!]a_{mi}$$

(6)

Accordingly, eq. (7) is obtained as indicated below.

$$\begin{aligned}b_{m+1,i} &= \frac{\Delta t^m}{m!} a_{m+1,i} \\ &= \frac{\Delta t^m}{m!} \cdot f_i(a_{m1}, a_{m2}, \ldots, a_{mn}) \\ &= \frac{\Delta t^m}{m!} \cdot f_i\left[\frac{(m-1)!}{\Delta t^{m-1}} b_{m1}, \frac{(m-1)!}{\Delta t^{m-1}} b_{m2}, \right. \\ &\qquad \left. \ldots, \frac{(m-1)!}{\Delta t^{m-1}} b_{mn}\right] \\ &= \frac{\Delta t}{m} \cdot f_i(b_{m1}, b_{m2}, \ldots, b_{mn}) \end{aligned}$$

(7)

The output of the integrator $i$ at $t = \Delta t$, $y_i(\Delta t)$, is then represented by eq. (8).

$$y_i(\Delta t) = b_{1i} + b_{2i} + \ldots + b_{mi} + \ldots$$
$$= \sum_{m=1}^{\infty} b_{mi} \tag{8}$$

In general, the output of the integrator $i$ when $\Delta t$ elapses after a certain time $t_0$, $y_i(t_0 + \Delta t)$, is exprdssed as in eq. (9).

$$y_i(t_0 + \Delta t) = y_i^{(0)} + \Delta t \cdot y_i^{(1)} + (\Delta t^2/2!) \cdot y_i^{(2)} + (\Delta t^3/3!) \cdot y_i^{(3)} + \ldots + (\Delta t^m/m!) \cdot y_i^{(m)} + \ldots \tag{9}$$

where
$$y_i^{(0)} = y_i(t_0) \text{ and}$$
$$y_i^{(m)} = f_i(y_1^{(m-1)}, y_2^{(m-1)}, \ldots y_n^{(m-1)})$$

The above-stated calculating method utilizes the property of a transfer function $1/s$ and the theorem of superposition.

As denoted by eq. (9), the $m$-th term $y_i^{(m)}$ may be calculated only with the value of the $(m-1)$-th term, $y_n^{(m-1)}$ (where $n = 1, 2, \ldots$). Since the calculation is simple, operation may be conducted at high speed. An error per step, $\epsilon i$, may be evaluated from eq. (9) and expressed as in eq. (10).

$$\epsilon i = (1/m!) \Delta t^m y_i^{(m)} \tag{10}$$

where $m$ is an approximate degree, and $\Delta t$ is a step width. That is, if the approximate degree $m$ is made infinite, the error $\epsilon i$ may be made infinitesimal without varying the step width $\Delta t$. However, information is required as to the maximum value of a solution. The maximum value need not be exact, but it may be of such accuracy that a scale factor is determinable so as to render the amplitude of the output signal of an operating element as large as possible within the range of operational units ($\pm 1$).

Accordingly, $m$ may be of a finite value. The calculative error and the calculating speed in that case are determined by the values of $m$ and $\Delta t$.

The foregoing calculating method has been described with reference to a linear differential equation with constant coefficients. Generally, however, a differential equation is classified as a linear differential equation or a nonlinear differential equation. The linear differential equation may be further classified as one with constant coefficients or one with variable coefficients. Even for nonlinear differential equation or the linear differential equation with variable coefficients, the above calculating method may be utilized without any change when the coefficients of the equation are considered to be linear during the step width $\Delta t$. However, there are equations wherein coefficients may not be regarded as being constant $\Delta t$. Such a case will be described below.

(1). Treatment of Multiplication

When a multiplier with dependent variables $y_1$ and $y_2$ is considered as a nonlinear operating element, their values when $\Delta t$ elapses after a certain time $t_0$, $y_1(t_0 + \Delta t)$ and $y_2(t_0 + \Delta t)$ may be represented by eqs. (11) and (12), respectively.

$$y_1(t_0 + \Delta t) = y_1^{(0)} + \Delta t\, y_1^{(1)} + (1/2!)\, \Delta t^2\, y_1^{(2)} + (1/3!)\, \Delta t^3\, y_1^{(3)} + \ldots \tag{11}$$

$$y_2(t_0 + \Delta t) = y_2^{(0)} + \Delta t\, y_2^{(1)} + (1/2!)\, \Delta t^2\, y_2^{(2)} + (1/3!)\, \Delta t^3\, y_2^{(3)} + \ldots \tag{12}$$

Accordingly, the product between $y_1(t_0 + \Delta t)$ and $y_2(t_0 + \Delta t)$, $y_3(t_0 + \Delta t)$, that is, the output of an integrator when $\Delta t$ elapses after the time $t_0$, is given by eq. (13).

$$y_3(t_0 + \Delta t) = y_1(t_0 + \Delta t) \cdot y_2(t_0 + \Delta t)$$
$$= y_1^{(0)} y_2^{(0)} + \Delta t\, (y_1^{(9)} y_2^{(1)}$$
$$+ y_2^{(0)} y_1^{(1)}) + (\Delta t^2/2!)\, (y_1^{(0)} y_2^{(2)}$$
$$+ 2 y_1^{(1)} y_2^{(1)} + y_2^{(0)} y_1^{(2)})$$
$$+ (\Delta t^3/3!\,) \, [3(y_1^{(1)} y_2^{(2)} + y_2^{(1)} y_1^{(2)})$$
$$+ y_1^{(0)} y_2^{(3)} + y_2^{(0)} y_1^{(3)}\,] + \ldots \tag{13}$$

As apparent from eq. (13), the m-th degree of term of the product between the dependent variables $y_1$ and $y_2$ may be determined only with terms of $y_1$ and $y_2$ of degrees lower than the $m$-th degree. Eq. (13) may accordingly be reduced to the following eq. (14).

$$y_3(t_0 + \Delta t) = y_3^{(0)} + \Delta t\, y_3^{(1)} + (\Delta t^2/2!)\, y_3^{(2)}$$
$$+ (\Delta t^3/3!)\, y_3^{(3)} + \ldots$$
$$+ (\Delta t^m/m!)\, y_3^{(m)} + \ldots \tag{14}$$

2. Treatment of Division

The quotient between dependent variables, $y_1/y_2$, may be expressed in the form of the product between $y_1$ and the inverse number of $y_2$, $1/y_2$, as in eq. (15).

$$y_1/y_2 = (y_1) \cdot (1/y_2) \tag{15}$$

Herein, assuming $1/y_2$ may be represented by the power series of a variation in an independent variable, it is possible to treat division with the treatment of multiplication as previously described. Thus, $y_2$ is expressed in the form of the power series of $\Delta t$ as given in eq. (12), so that $1/y_2$ may be approximately evaluated as in eq. (16).

$$1/y_2 = (1/y_2^{(0)}) - \Delta t\, (1/y_2^{(0)})^2 y_2^{(1)} - (\Delta t^2/2!)\, (1/y_2^{(0)})^3$$
$$[y_2^{(0)} y_2^{(2)} + 2(y_2^{(1)})^2] - (\Delta t^3/3!)\, (1/y_2^{(0)})^4$$
$$[(y_2^{(0)})^2 y_2^{(3)} + 3 y_2^{(0)} y_2^{(1)} y_2^{(2)} + 6(y_2^{(1)})^3\,] + \ldots \tag{16}$$

Accordingly, the quotient $y_1/y_2$ may be represented as in eq. (17), and the $m$-th degree of term may be determined only with the values of the dependent variables $y_1$ and $y_2$ of the degree lower than the $m$-th degree.

$$y_1/y_2 = y_1^{(0)} \cdot (1/y_2^{(0)}) + \Delta t \, (1/y_2^{(0)})^2 \, (y_2^{(0)} \, y_1^{(1)}$$
$$- y_1^{(0)} y_2^{(1)}) + (\Delta t^2/2!) \, (1/y_2^{(0)})^3 \, [(y_2^{(0)})^2 y_1^{(2)}$$
$$- 2y_1^{(0)} (y_2^{(1)})^2 - 2y_2^{(0)} \, y_1^{(1)} \, y_2^{(1)}$$
$$- y_1^{(0)} \, y_2^{(0)} \, y_2^{(2)}] + \ldots$$

(17)

3. Treatment of General Functions

General functions such as the trigonometric function, logarithmic function and exponential function, may be approximated by the power series of the input. All the functions which may be approximated by the power series of the input, are treatable by applying the procedure of calculation of exponents as explained above.

The treatment of a trigonometric is described below with reference to a sine function. The sine function $\sin y_1$ may be approximated by the power series of an input variable $y_1$ as given in eq. (18).

$$\sin y_1 = k_0 \, y_1 + k_1 \, y_1^3 + k_2 y_1^5 + k_3 \, y_1^7 + \ldots$$

(18)

(where $k_0, k_1, k_2, k_3, \ldots$ are constants.

Since the input variable $y_1$ is expressed as given in eq. (11), eq. (18) is reduced to eq. (19).

$$\sin y_1 = k_0 \, (y_1^{(0)} + \Delta t \, y_1^{(1)} + (\Delta t^2/2!) \, y_1^{(2)} + \ldots) +$$
$$k_1 \, (y_1^{(0)} + \Delta t \, y_1^{(1)} + (\Delta t^2/2!) \, y_1^{(2)} + \ldots)^3 +$$
$$k_2 \, (y_1^{(0)} + \Delta t \, y_1^{(1)} + (\Delta t^2/2!) \, y_1^{(2)} + \ldots)^5$$
$$+ \ldots$$

(19)

The calculation of exponents of and after the second term on the right side of eq. (19) may be easily treated by applying the procedure of multiplication as previously explained. The approximate solutions of the respective variables of the differential equation for every time width $\Delta t$ are computed by the foregoing calculating methods, and the maximum values of the respective variables are found from the approximate solutions.

The following is a description of a method for conducting scaling of a differential equation on the basis of the maximum values of the respective variables obtained as in the foregoing manner. In the case where a variable $y$ is subjected to the voltage scaling of $\beta y = Y$ ($\beta$ is the voltage scale factor, $Y$ is the operational variable) and the operational variable $Y$ is evaluated as the output of an operating element, the voltage scale factor $\beta$ is required to satisfy the condition of eq. (20), the maximum value of the absolute value of the variable $y$ being $|y|$ max.

$$\beta \leq 1/|y|_{max}$$

(20)

In general, the reliability of an operating element is expressed by the ratio of an error signal to the maximum rating value of the operating element. As a consequence, when an output amplitude is small, a relative error is increased to that extent. Thus, assuming an operating element of 100V in the maximum amplitude and 0.1 percent in the reliability functions at an output amplitude 10V, the redundancy of an output signal is only ensured up to 1 percent. Accordingly, in order to keep the operational accuracy as high as possible, it is preferable to ensure that the amplitude of the output signal of the operating element may become as large as the possible limit. For this reason, the scale factor $\beta$ should be made as large as possible. However, if it is excessively large, the output amplitude will scale over which is a disadvantage. Accordingly, the scale factor $\beta$ is selected at the largest possible value within a limited range. It is selected so that the output amplitude of the operating element may be 50 to 100 percent of the maximum amplitude as a tentative aim. More specifically, a tentative maximum value $y'$ max slightly larger than the maximum value $y$ max of the solution is selected, and the scale factor $\beta$ is evaluated using the tentative value and by eq. (21).

$$\beta = 1/|y|_{max}$$

(21)

In other words, assuming the maximum value of the approximate solution is designated as Q and the tentative maximum value is R, it is desired that for determining $\beta$, R be set to provide the relationship $\frac{1}{2} < Q/R < 1$.

Each variable is multiplied by the scale factor $\beta$ thus evaluated. With the operational variable Y thereby obtained, the given equation is rewritten and the voltage scaling is thus carried out. This is discussed below in greater detail.

A differential equation is generally represented by simultaneous equations of the first order as in eq. (22).

$$dy_1/dt = f_1 \, (t, y_1, y_2, \ldots, y_n)$$
$$dy_2/dt = f_2 \, (t, y_1, y_2, \ldots, y_n)$$

(22)

$$dy_n/dt = f_n \, (t, y_1, y_2, \ldots, y_n)$$

Now, consider the differential equation with constant coefficients, and employ the matrix representation. Then, Eq. (23) is obtained.

$$\begin{bmatrix} \frac{dy_1}{dt} \\ \frac{dy_2}{dt} \\ \vdots \\ \frac{dy_n}{dt} \end{bmatrix} = \begin{bmatrix} K_{11} K_{12} \ldots K_{1n} \\ K_{21} K_{22} \ldots K_{2n} \\ \vdots \\ K_{n1} K_{n2} \quad K_{nn} \end{bmatrix} \begin{bmatrix} y_1 \\ y_2 \\ \vdots \\ y_n \end{bmatrix} + \begin{bmatrix} h_1(t) \\ h_2(t) \\ \vdots \\ h_n(t) \end{bmatrix}$$

Figure 4:
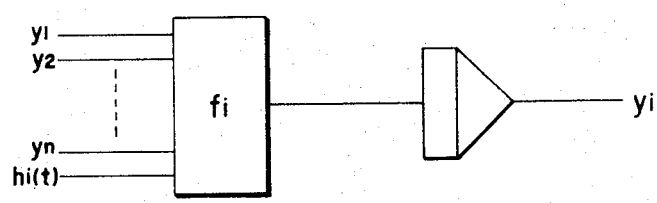

(23)

where $k_{i,j}$ indicates constant coefficients, while $h_i(t)$ forcible terms include constants $i, j = 1, 2, \ldots, n$. Additionally, the initial value of each $y_i$ is $y_{i0}$. Eq. (23) may be represented in the form of an operating circuit as shown in FIG. 4.

Since it is desired for the voltage scaling in this case to make the output $y_i$ of an integrator have the maximum allowable amplitude, the scaling is conducted in accordance with eq. (24) where $\beta_i$ designates the voltage scale factor and $Y_i$ the operational variable for each variable $y_i$ ($i = 1, 2, \ldots, n$) in eq. (23).

$$\beta\, y_i = Y_i \tag{24}$$

As the result, eq. (23) is reduced to eq. (25).

$$\begin{bmatrix} \dfrac{dY_1}{dt} \\ \dfrac{dY_2}{dt} \\ \vdots \\ \dfrac{dY_n}{dt} \end{bmatrix} = \begin{bmatrix} K_{11} & K_{12}\dfrac{\beta_1}{\beta_2} & \cdots & K_{1n}\dfrac{\beta_1}{\beta_n} \\ K_{21}\dfrac{\beta_2}{\beta_1} & K_{22} & \cdots & K_{2n}\dfrac{\beta_2}{\beta_n} \\ \vdots & & & \vdots \\ K_{n1}\dfrac{\beta_n}{\beta_1} & K_{n2}\dfrac{\beta_n}{\beta_2} & \cdots & K_{nn} \end{bmatrix} \begin{bmatrix} Y_1 \\ Y_2 \\ \vdots \\ Y_n \end{bmatrix} + \begin{bmatrix} \beta_1 h_1(t) \\ \beta_2 h_2(t) \\ \vdots \\ \beta_n h_n(t) \end{bmatrix} \tag{25}$$

where the initial value $Y_{i0} = \beta_i y_{i0}$.

Figure 5:
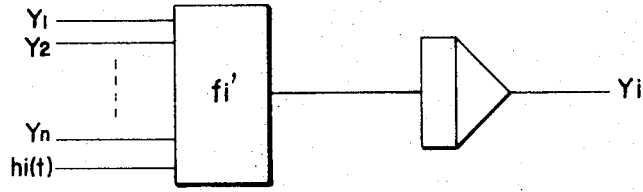

An operating circuit for eq. (25) is as illustrated in FIG. 5. That is, the voltage scaling for the linear differential equation with constant coefficients may be made by modifying the input coefficients, forcible terms and initial values of each integrator. However, where the forcible term $h_i(t)$ is not a constant, i.e., where it is a time function, it is at times required to also conduct voltage scaling for $h_i(t)$. This scaling will be discussed below.

Now, considering voltage scaling for a nonlinear differential equation and a linear differential equation with variable coefficients, it should be noted that with regard to differential equations for which operating circuits are constituted with nonlinear operating elements, it is not sufficient to only perform scaling with respect to the foregoing equations. For example, assuming that in case of a function generator that the maximum value of an input variable of the function generator and the maximum set value of the X-axis of the function generator are brought into correspondence with 1 (one), then the scale factor at that time and the scale factor evaluated from the equations are not necessarily coincident. It is therefore necessary to correct the input coefficient of the function generator and to ensure that the value of the input variable and the set value precisely correspond.

In the case of a divider, a divisor and a dividend are similarly brought into correspondence with numerical values less than 1 (one), respectively, as the result of scaling based on the equations. When, however, the dividend is larger than the divisor, the output of the operating unit scales over. Accordingly, it is necessary to correct the input coefficient of the divider so as to always maintain the dividend smaller than the divisor. Thus, the voltage scaling for the equation whose operating circuit includes any nonlinear operating elements should result in modification of the input coefficients for each integrator and each nonlinear element as is described below.

(1) Scaling for Function Generator

Figure 6:
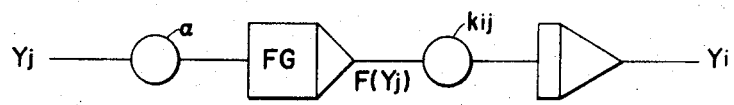

Function generators generally provided in a computer include a trigonometric function generator, a logarithmic function generator, an arbitrarily set function generator, etc. and such function generators generally have one variable. An operating circuit for such a function generator is represented in FIG. 6. In the figure, FG designates the function generator, $Y_j$ an input variable of the function generator FG, $F(Y_j)$ an output variable of the function generator FG, $Y_i$ an output variable of an integrator, $\alpha$ an input coefficient of the function generator, and $F_{ij}$ an input coefficient of the integrator.

The voltage scaling in this case is conducted so that, when the input variable $Y_j$ is subjected to the scaling of $Y_j = \beta_j y_j$, the maximum values of the output $F(Y_j)$ of the function generator FG and the output $Y_i$ of the integrator may become 1 (one). In addition, it is a requirement that the maximum value $Y_{j\,max}$ of the input variable of the function generator FG and the maximum set value $X_{max}$ of the X-axis are brought into correspondence.

Assuming that the output variable $Y_i$ of the integrator is $Y_i = \beta_i y_i$, and that the maximum set value of the Y-axis of the function generator FG is $f(x)_{max}$, then in order to cause the set values and the variable values of the function generator FG to correspond, the input coefficient of the integrator and that of the function generator should be transformed as in eqs. (26) and (27) respectively.

$$k_{ij'} = \beta_i \cdot f(x)_{max} \cdot k_{ij} \tag{26}$$

$$\alpha' = (1/X_{max}) \cdot (1/\beta_j) \tag{27}$$

2. Scaling for Multiplier

Since a multiplier conducts an operation such that $1 \times 1 = 1$ (100V × 100V = 100V), no overscale occurs. In contrast, the multiplication between very small inputs may cause deterioration of the required precision to ensure proper results. Accordingly, it is required for the voltage scaling for a multiplier that the input variables be perfectly scale-transformed.

Figure 7:
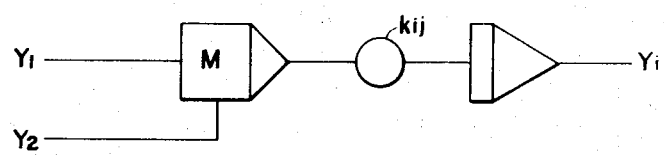

An operating circuit including a multiplier is schematically illustrated in FIG. 7. In the figure, M designates the multiplier, $Y_1$ and $Y_2$ input variables of the multiplier M, $Y_i$ an output variable of an integrator, and $k_{ij}$ an input coefficient of the integrator. FIG. 7 is represented by eq. (28)

$$\dot{y}_i = k_{ij} \cdot y_1 \cdot y_2 \tag{28}$$

Assuming that the input variables $y_1$ and $y_2$ of the multiplier M are respectively scale-transformed into $\beta_1 y_1 = Y_1$ and $\beta_2 y_2 = Y_2$, then rewriting eq. (28) using these values, the input coefficient of the integrator is transformed as in eq. (29) to cause the output variable $Y_i$ of the integrator function to be at the maximum allowable amplitude.

$$k_{ij'} = \beta_i \times (1/\beta_1) \times (1/\beta_2) \times k_{ij} \tag{29}$$

where $y_i \beta_i = Y_i$.

3. Scaling for Divider

Figure 8:
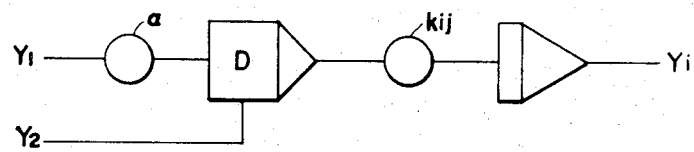

As previously stated, even when scaling is carried out for each of a dividend and a divisor, the output of the operating unit scales over in the case where the dividend is larger than divisor. In the case where the divisor is zero, the output becomes infinite. In the former case, the input coefficients of the divider may be corrected so that the dividend may be always smaller than the divisor, whereas in the latter case, corrections are impossible. It is therefore assumed that the divisor satisfies the condition that it must not become zero, and thus, scaling for a divider is explained with reference to FIG. 8 which discloses an operating circuit comprising a divider.

In the figure, D represents the divider, $Y_1$ and $Y_2$ a dividend and a divisor of the divider D, respectively, $Y_i$ an output variable of an integrator, $\alpha$ an input coefficient of the divider D, $k_{ij}$ an input coefficient of the integrator.

Now, by letting the output variable $Y_i$ of the integrator be $\beta_i y_i$, the dividend $Y_1$ of the divider D be $\beta_1 y_1$, the divisor $Y_2$ of the divider D be $\beta_2 y_2$, and the minimum value of $y_2$ be $y_2$ min, then the input coefficient of the integrator and that of the divider D is transformed in accordance with the following eqs. (30) and (31).

$$k_{ij'} = k_{ij} \times \beta_i \times (\text{maximum value of divider output})$$
$$= k_{ij} \times \beta_i \times (1/\beta_1) \times (1/y2\ min)$$

(30)

$$\alpha' = \beta_2 \times y_{2\ min}$$

(31)

Figure 9:
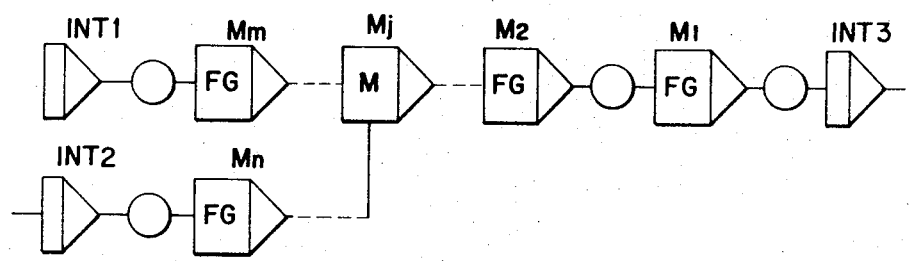

While the above discussion has been directed to the voltage scaling processes for individual nonlinear elements, such circuits are, in general, combined to constitute an operating circuit. Thus, nonlinear terms $k_{ij} \cdot g_i$ ($y_1, y_2, \ldots, y_n, t$) of simultaneous differential equations of the first order are constituted into a circuit which, as shown in FIG. 9, includes a set of nonlinear operating elements $M_1, M_2, \ldots, M_j, \ldots, M_m, \ldots, M_n$ between integrators INT 1, INT 2 and an integrator INT 3. In this circuit, the aforedescribed voltage scalings for the individual nonlinear operating elements are continuously performed in succession for the nonlinear operating elements $M_{m-1}, M_{m-2}, \ldots M_2$ and $M_1$. As the voltage scaling proceeds, the input coefficients of the respective operating elements are modified, and finally, the input coefficient of the integrator INT 3 is modified. In this case, the voltage scaling for a multiplier corresponding to $M_j$ requires that the voltage scalings for the output elements from $M_m$ to $M_j$ of the integrator INT 1 and those for the output elements from $M_n$ to $M_j$ of the integrator INT 2 be completed.

As previously stated, the independent variable $t$ is not only related to differential coefficients, but also scaling therefor as in the case where it appears superficially in the equations. More specifically, in the case where the independent variable is superficially contained in a given differential equation as indicated in eq. (32), $t$ itself should be treated in the form of a voltage signal as one operational variable.

$$dy/dt = Kt$$

(32)

In eq. (32), the right side signifies a voltage signal which increases with the lapse of time and in proportion thereto, and $t$ on the right side differs in significance from $t$ appearing at $dy/dt$ on the left side. Thus, the right side is a voltage signal, and requires treatment as the operational variable. Therefore, it should be treated in the same manner as in the aforedescribed voltage scalings. Accordingly, it is necessary to conduct voltage scaling in accordance with eq. (33) in which $\beta_t$ represents the voltage scale factor of $t$.

$$\beta_t \cdot t = T$$
$$(\beta_t = 1/|t|_{max})$$

(33)

This scaling is the same scaling as utilized for a dependent variable.

In the above, the process for carrying out the voltage scaling so as to make the output amplitude of each operating element as large as possible, in order to obtain highly precise solution in solving a given differential equation by a computer has been described. However, when the coefficients of the operating equations obtained as the result of the voltage scalings do not fall within a set range within which they may be treated by the computer, a time scale factor $\alpha_t$ as in eq. (34) is derived from the maximum value $|k_{ij'}|_{max}$ of the coefficients so that said maximum value may be transformed to the maximum value $K$ which may be set by the computer. Thus, time scaling is conducted.

$$\alpha_t = (1/K)|k_{ij'}|_{max}$$

(34)

Due to the time scaling, all the numerical values in the equations are covered within the set range which the computer may treat, and it is ensured that the solution is obtained in a suitable calculating period of time.

The time scaling for simultaneous differential equations of the first order is described in the following. Simultaneous linear and nonlinear differential equations of the first order are expressed by eq. (35).

$$dy_i/dt = f_i (y_1, y_2, \ldots, y_n, t) + g_i (y_1, y_2, \ldots y_n, t) y_i + g_i (y_1, y_2, \ldots, y_n, t) + h_i (t) \quad (i = 1, 2, \ldots, n)$$

(35)

where $f_i (y_1, y_2, \ldots, y_n, t)$ designates linear terms, $g_i (y_1, y_2, \ldots, y_n, t) y_i$ and $g_i (y_1, y_2, \ldots, y_n, t)$ nonlinear terms, and $h_i (t)$ forcible terms. When $g_i$ and $g_i$ 24 = 0, eq. (35) becomes a linear differential equation.

In eq. (35), time scaling as in eq. (36) is conducted with $\tau$ being an operational variable for the independent variable $t$. Then, eq. (35) is reduced to eq. (37).

$$\alpha_t \cdot t = \tau$$

(36)

$$dy_i/d\tau = (1/\alpha_t) f_i (y_1, y_2, \ldots, y_n, \tau/\alpha_t)$$
$$+ (1/\alpha_t) g_i (y_1, y_2, \ldots, y_n, \tau/\alpha_t) y_i$$
$$+ (1/\alpha_t) g_i (y_1, y_2, \ldots, y_n, \tau/\alpha_t)$$
$$+ (1/\alpha_t) h_i (\tau/\alpha_t)$$

(37)

Thus, the time scaling is carried out in such a manner that the input coefficients of all the integrators constituting the operating circuit are multiplied by $1/\alpha_t$.

Figure 10:
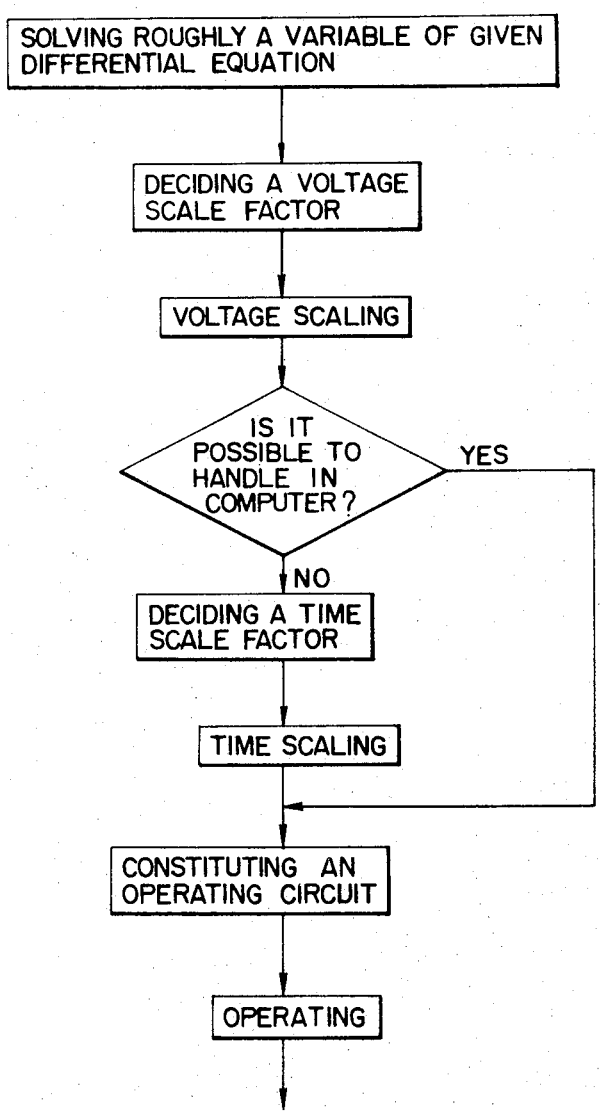
FIG. 10 is a flow chart for explaining an automatic scaling system of this invention.

While the principle of the automatic scaling system according to this invention has been stated in detail in the above, it is schematically illustrated in the flow chart of FIG. 10. As apparent from the figure, in accordance with the automatic scaling system of this invention, an original differential equation is numerically analyzed in digital form to determine approximate solutions for the respective variables, and to calculate the maximum values for the respective variables. On the basis of the maximum values, voltage scale factors are determined, and voltage scaling is carried out. It is determined whether or not, as the result of the voltage scaling, all the numerical values in the equations fall within a predetermined range which may be treated by a computer. In the case where the treatment is impossible, a time scale factor is derived from the maximum value of coefficients in the equations, and time scaling is executed. In conformity with the scaling thus obtained, an operating circuit is arranged, and the operation is performed.

Embodiments of devices for forming the automatic scaling system according to the present invention are described below in detail with reference to the accompanying drawings.

Figure 11:
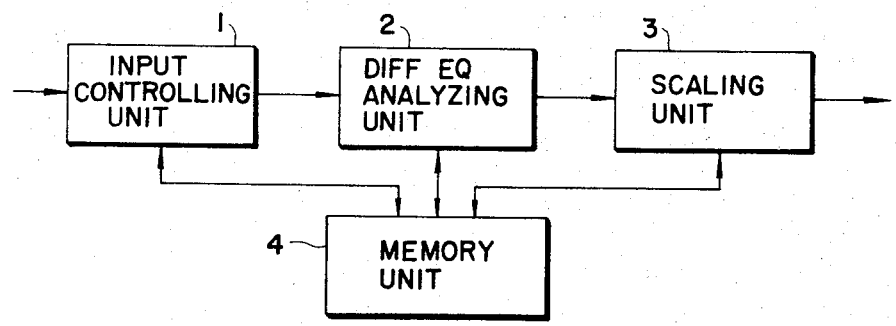
FIG. 11 is a block diagram schematically showing an automatic scaling device according to this invention.

FIG. 11 is a block diagram schematically showing an automatic scaling device in accordance with the present invention having an input controlling unit 1, a differential equation analyzing unit 2, a scaling unit 3 and a memory unit 4. In the figure, an original differential equation is transformed into simultaneous differential equations of the first order. They are supplied to the input controlling unit 1 by any suitable means such as a tape or card, and are further transformed into operational block information representing the connection of the operating circuits by the unit. Thereafter, they are stored in the memory unit 4. The differential equation analyzing unit 2 calculates approximate solutions of the respective variables corresponding to the respective operating elements, in conformity with the principle as above explained utilizing the operational block information stored in the memory unit 4. Thus, the respective maximum values for the variables are determined. Furthermore, voltage scale factors for the respective variables are calculated, which factors are stored in the memory unit 4 together with the operational block information previously stored.

The scaling unit 3 determines input coefficients of the respective operating elements in conformity with the foregoing principle utilizing the operational block information and voltage scale factors in the memory unit 4. When the voltage scaling is completed, all the coefficients are examined. Time scaling is carried out in accordance with the foregoing principle so that all the coefficients may be treated by a computer. As the result of this scaling, the operational blocks are revised with the final, operational block information being stored in the memory unit 4.

A switching matrix is controlled with the operational block information, whereby an analog operating circuit corresponding to the original equation may be constituted. On the other hand, with a computer having no switching matrix and constituting an operating circuit on a patchboard by a patch code, a user may perform patching works in such a way that the scale-transformed operational block information are outputted in the form of an operational block chart of a connection table of operating elements.

In the case where, in the course of advancing operation, an operated solution scales over or exhibits a very small amplitude on account of the alteration of a parameter or any other condition, scaling is again required. In this case, it is possible to automatically determine scale factors by monitoring outputs of the respective operating elements, so as to conduct scaling. In other words, the function of on-line scaling may be provided whereby scaling is carried out during the operation.

Figure 12:
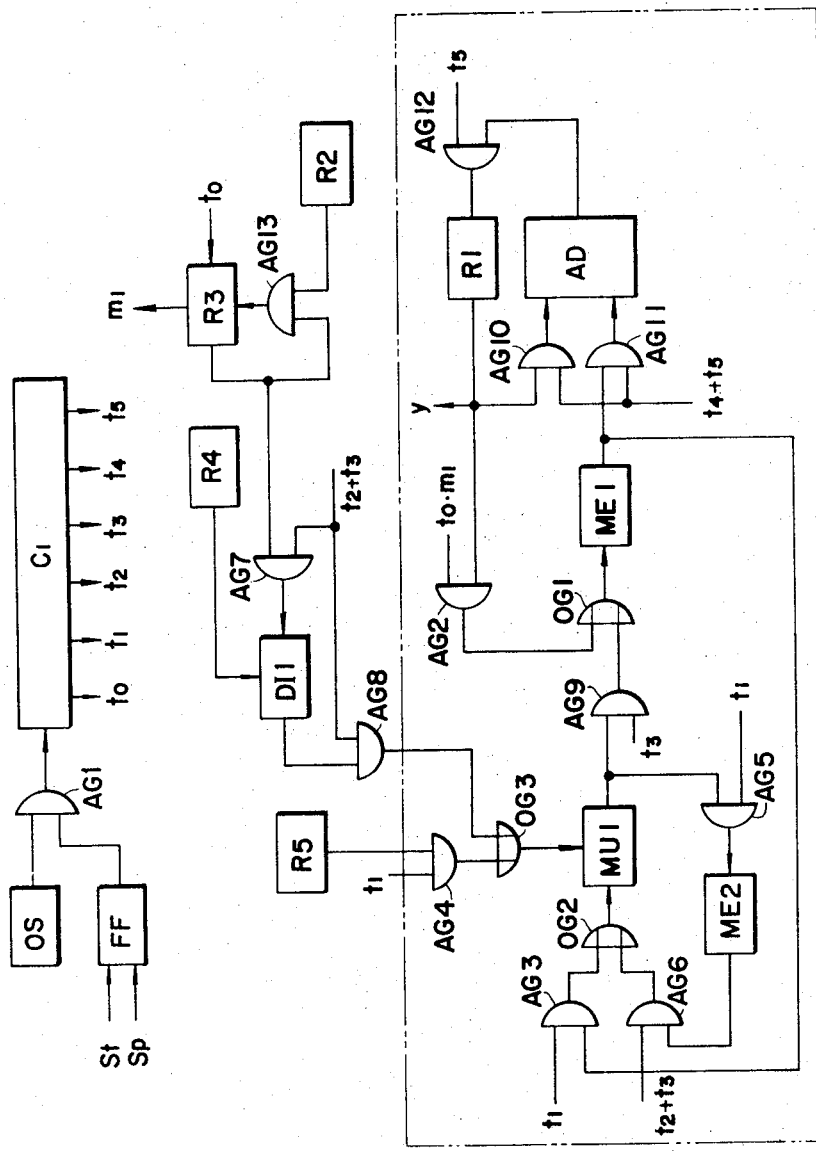
FIG. 12 is a block diagram circuit arrangement of an embodiment of a differential equation analyzing unit of FIG. 11.

FIG. 12 illustrates an embodiment of a device for evaluating approximate solutions for the respective variables, which device forms the principal part of the differential equation analyzing unit 2 illustrated in FIG. 11. In this figure, the notations MU 1, DI 1 and AD represent logical circuits effecting multiplication, division and addition, respectively, ME 1 and ME 2 memory elements, FF a flip-flop, OS a pulse generator, C 1 a counter, R 1 to R 5 registers, AG 1 to AG 13 AND gates, OG 1 to OG 3 OR gates, st a start signal, sp a stop signal, $t_0$ to $t_5$ timing signals, $m_1$ a signal generated when the timing signal $t_0$ is first entered, and y an output signal of the computed result.

Among the registers R 1 to R 5, R 1 is a register for holding an initial value and a computed result, R 2 serves for specifying an approximate degree $m$, R 3 serves for counting approximate degrees being presently computed, R 4 serves for holding a step width $\Delta t$, and R 5 serves for holding an input coefficient.

The portion enclosed by dotted lines serves for evaluating the approximate solution of each variable of the equation, whereas the other portion is a control portion. Accordingly, it is also possible to find approximate solutions of a plurality of variables by providing a plurality of devices composed of the portion enclosed by dotted lines, with these devices being simultaneously and commonly controlled.

The operation of the device of FIG. 12 will now be described in detail with reference to the solving of the differential equation of eq. (38).

$$dy/dt = K\, y \text{ where } y(0) = y_0 \tag{38}$$

It is assumed that an input coefficient $K$ is set in the register R 5, the initial value $y_0$ is set in the register R 1, and that the register R 3 is at zero.

When the start signal st enters the flip-flop FF, its output becomes 1, the AND gate AG 1 is opened and pulses from the pulse generator OS enter the counter C 1. The counter C 1 starts the function of generating the timing signals $t_0, t_1, \ldots, t_5$ successively and repeatedly. When the counter C 1 starts functioning, the contents of the register R 3 is turned to 1 at the first time of the timing signal $t_0$, and simultaneously, a signal $m_1$ is generated therefrom. AG 2 is opened by the signals $t_0$ and $m_1$, so that the contents of the register R 1, i.e., the initial value $y_0$, are stored in the memory element ME 1 via OG 1. Next, when the timing signal $t_1$ is generated, the AND gate AG 3 is opened so that the contents $y_0$ of the memory ME 1 are supplied through the AND gate AG 3 and OR gate OG 2 to the multiplier circuit MU 1. On the other hand, the AND gate AG 4 is opened by the timing signal $t_1$, and the contents of the register R 5, i.e. the input coefficient K, are already supplied through the OR gate OG 3 to the multiplier circuit MU 1. The multiplier circuit 1 therefore outputs the product between $y_0$ and K, $y_0 \cdot K$. The output is stored in the memory element ME 2 through AG 5 which is already opened by the timing signal $t_1$.

Subsequently, the AND gate AG 6 is opened by the timing signal $t_2$, and thus, the contents $y_0 \cdot K$ of the memory element ME 2 are supplied through the OR gate OG 2 to the multiplier circuit MU 1. Additionally, the AND gates AG 7 and AG 8 are opened by the timing signal $t_2$. After the contents of the register R 4, i.e., the step width $\Delta t$, and the approximate degree 1 in the register R 3 are supplied to the divider circuit DI 1, the divided result $\Delta t/1$ obtained in the divider circuit DI 1 is already supplied through the AND gate AG 8 and OR gate OG 3 to the multiplier circuit MU 1. The multiplier circuit MU 1 accordingly outputs the product between $y_0 \cdot K$ and $\Delta t/1$, $(\Delta t/1) y_0 K$. The output is stored in the memory element ME 1 through the AND Gate AG 9 and OR gate OG 1 by means of the timing signal $t_3$. Next, the AND gates AG 10 and AG 11 are opened by the timing signal $t_4$. The contents $\Delta t\, y_0\, K$ of the memory element ME 1 and the stored contents $y_0$ in the register R 1 are thereby supplied to the adder circuit AD, so that their sum $y_0 + \Delta t\, y_0 K$ is obtained. The AND gate AG 12 is opened by the timing signal $t_5$, so that the added result $y_0 + \Delta t\, y_0\, K$ of the adder circuit AD is stored in the register R 1.

When the timing signals are generated up to $t_5$, the counter C 1 generates the timing signal $t_0$. The counter C 1 generates the timing signal $t_0$ again since it is a hexamerous counter. The approximate degree in the register R 3 is advanced to 2 at this time. Upon repetition of the same function as in the above, $(y_0 + \Delta t y_0 K + (\Delta t^2/2) y_0 K^2)$ is stored in the register R 1 at the timing signal $t_5$.

In this manner, the same function is repeated in succession. When the contents of the register $R_3$ become equal to those of the register $R_2$, i.e. the approximate degree $m$, the AND gate AG 13 is opened, and the register R 3 is reset. Accordingly, the calculation is conducted until the predetermined approximate degree $m$ set in the register is reached. As the result, the output $y_{\Delta t}$ of the register R 1 is given by eq. (39).

$$y_{\Delta t} = y_0 + \Delta t\, y_0 + (\Delta t^2/2) K^2 y_0 + (\Delta t^3/6) K^3 y_0 + \ldots \quad (39)$$

Figure 13:
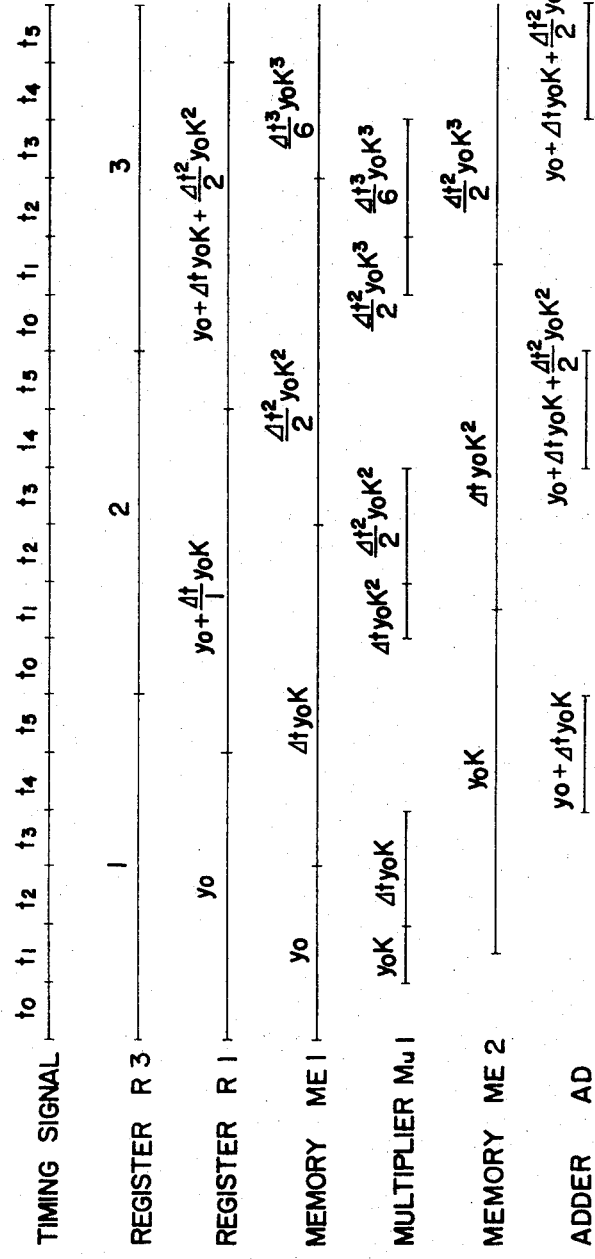
FIG. 13 is a time chart showing the relationship among the outputs of the various parts in FIG. 12.

Eq. (39) denotes the solution of the variable $y$ after the lapse of the period of time $\Delta t$ from $t = 0$. The calculation of a solution after the next period of time $\Delta t$ is accomplished such that the output signal $y$ of the register R 1 is set in the register R 5 as the initial value, and that an operation as described above is performed. The solution for the variable $y$ for each period of time of $\Delta t$ is evaluated in this manner, whereby the maximum value for the variable $y$ is determined. This operation is clearly shown in FIG. 13 which is a time chart showing output states of various parts in FIG. 12.

Figure 14:
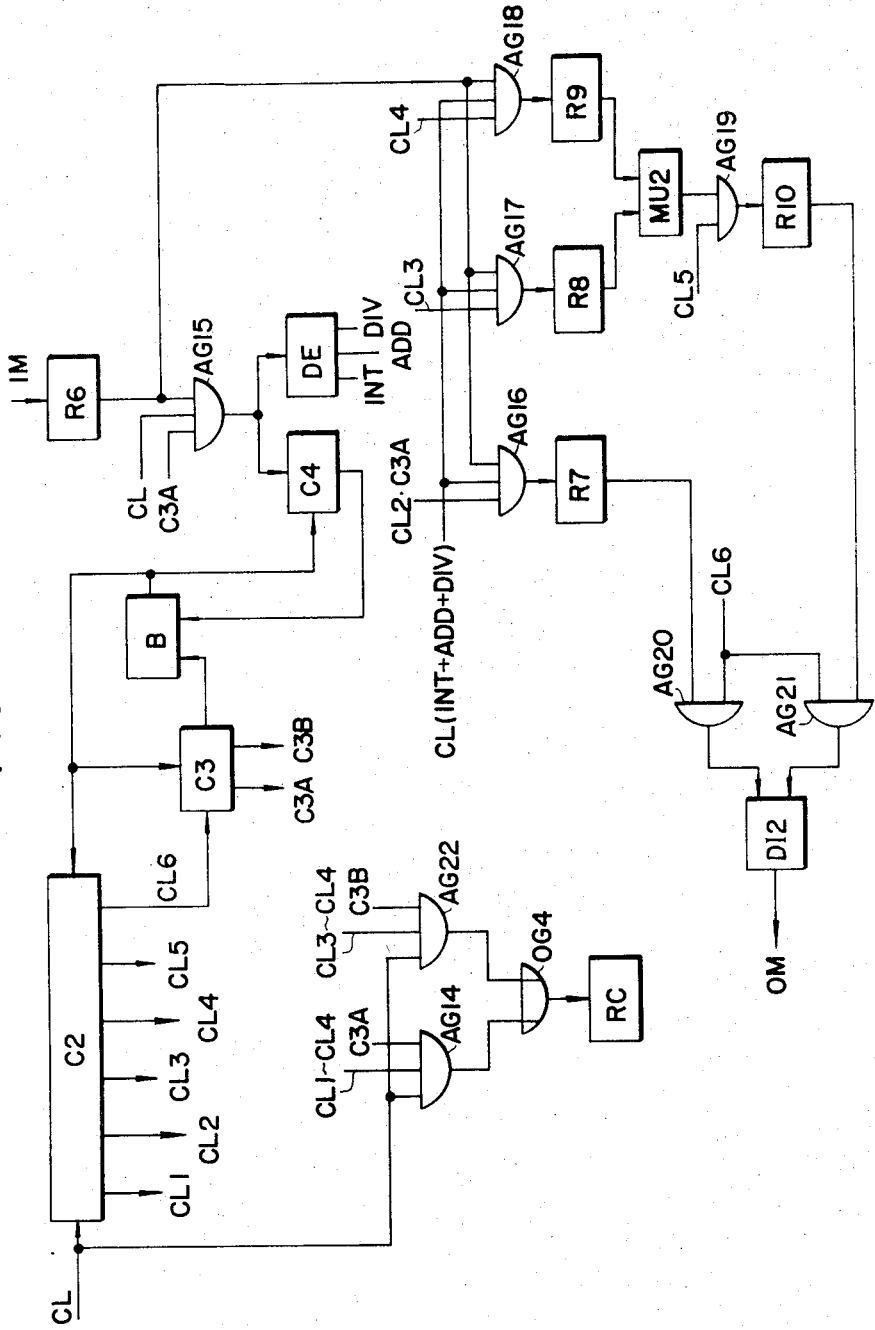
FIG. 14 is a block diagram circuit arrangement of an embodiment of a scaling unit of FIG. 11.

FIG. 14 illustrates an embodiment of the fundamental part of the scaling unit 3 in FIG. 11, this part being a device which conducts voltage scaling for an integrator, adder and divider. Referring to the figure, C 2 to C 4 represent counters, B a coincidence circuit, RC a memory read-out controlling circuit, R 6 to R 10 registers, DE a decoder, MU 2 a multiplier circuit, DI 2 a divider circuit, AG 14 to 22 AND gates, OG 4 and OR gate, CL a clock pulse, CL 1 to CL 6 timing signals, INT; ADD and DIV signals expressing the type of operating elements and reseptcively indicating an integrator, adder and divider, IM an input signal from the memory unit 4, OM an output signal to the memory unit, and C3A and C3B signals respectively indicating that the contents of the counter C 3 are zero and that they are not zero.

FIG. 15 is an operational block diagram for explaining the function of the device in FIG. 14. I 1 to 14 designate integrators, A 1 an adder, D 1 a divider, K 1 and K 2 input coefficients of the adder A 1, K 3 an input coefficient of the divider D 1, and K 4 an input coefficient of the integrator I 4.

FIG. 16 is a chart illustrating an example of the construction of data treated by the scaling unit in FIG. 14, and corresponding to the operational block diagram in FIG. 15, the data being prepared in the input controlling unit 1 and the differential equation analyzing unit 2 of FIG. 11.

The function of the device in FIG. 14 will now be described in conjunction with the operational block diagram in FIG. 15. First, the contents of the counter C 3 is made zero, and the signal C3A is generated. Simultaneously with the starting of scaling, the clock pulse CL is generated and is supplied to the hexamerous counter C 2. In the counter C 2, the timing signals CL 1 to CL 6 are successively and repeatedly generated every clock pulse CL. When the timing signal CL 1 is generated, the AND gate 14 is opened. The signal C3A from the counter C 3 is applied to the memory read-out controlling circuit RC through the OR gate OG 4. The circuit RC is thus actuated, to read out contents of (a) in FIG. 16 and hold them in the register R 6 as the input signal IM. The input signal is further inputted through the AND gate AG 15 to the decoder DE and the counter C 4. Herein, a part representing the name of an element (A 1) is set in the decoder DE, while the number of the element input coefficient (2) is set in the counter C 4. In this case, the signal INT, ADD or DIV is outputted from the decoder DE. On the other hand, the contents of the counter C 4 are sent together with the contents of the counter C 3 to the coincidence circuit B. Since, however, both the contents are not coincident, no signal is provided from the coincidence circuit.

When the timing signal CL 2 is generated by the next clock pulse CL, the subsequent memory contents, i.e. (b) in FIG. 16, are read out in the register R 6 through the function of the controlling circuit RC, and they are set in the register R 7 via the AND gate AG 16. Similarly, the contents of (c) in FIG. 16 are set in the register R 8 via the AND gate AG 17 by the following timing signal CL 3, while the contents of (d) in FIG. 16 are set in the register R 9 via the AND gate AG 18 by the timing signal CL 4. The contents of the registers R 8 and R 9 are immediately subjected to multiplication by the multiplier circuit MU 2. The contents of the multiplier circuit MU2 are set through the AND gate AG 19 in the register R 10 by the next timing signal CL 5.

At the next stage, the AND gates AG 20 and AG 21 are opened by the timing signal CL 6, and the contents of the registers R 7 and R 10 are supplied to the divider circuit DI 2. Division of (contents of register 10/ those of register 7) is therein carried out, and the result is transmitted to the memory unit as the output signal OM. The control circuit RC is not actuated by the timing signals CL 5 and CL 6, and no read-out is effected during the period of the signals. The contents of the counter C 3 are advanced to 1 by the timing signal CL 6. The output OM of the divider circuit DI 2 is thereby represented by eq. (10), and the scaling for the input coefficient K 1 of the adder A 1 is completed.

$$OM = K1 \times I1M / A1M \quad (40)$$

Since the contents of the counter C 3 become 1 and those of the counter C 4 are 2, there is no output from the coincidence circuit B. The contents of the counters C 3 and C 4 are held without being reset. On the other hand, the timing signal CL 1 is provided from the counter C 2 by the next clock pulse CL. The contents of the counter 3 are not zero and the signal C3B is being provided at this time, so that the read-out of the memory is not conducted until the timing signal CL2. When the timing signal CL 3 is generated, the AND gate AG 22 is opened, the control circuit RC is actuated, the contents of (e) in FIG. 16 are read out, and they are set in the register R 8 through the AND gate AG 17.

The contents of (f) in FIG. 16 are set through the AND gate AG 18 in the register R 9 by the next timing signal CL 4. The scaling for the input coefficient K 2 is carried out by the timing signals CL 5 and CL 6 and in the manner described above. The contents of the counter C 3 are advanced to 2 by the timing signal CL 6. They coincide with the contents of the counter C 4, so that the counters C 2, C 3 and C 4 are reset. The counter C 2 provides the timing signal CL 1 by the subsequent clock pulse CL. Read-out from the next data, i.e. the contents of (g) in FIG. 16 is effected. A function similar to the foregoing one is repeated, to advance the scaling.

Since scaling may be automatically performed in succession in this manner, scaling based on desk works and trial-and-error operations as in the prior art may be eliminated, and the transforming period of time may be remarkably shortened. It is possible to release a user from scaling works which have heretofore been particularly troublesome and required a long time.

While we have shown only one embodiment of the devices forming the automatic scaling unit of the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A control system for automatic scaling of operational coefficients of operating elements of an analog or hybrid computer, said system comprising memory means for storing information which is read-in and read-out, means for transforming an original differential equation into operational block information, said memory means being operatively connected to said transforming means for storing said operational block information, analyzing means operatively connected to said transforming means and said memory means for calculating an approximate solution for each variable of the equation in accordance with said operational block information and for determining a scale factor from a maximum value of the approximate solution, said scale factor for each of said variables being stored in said memory means, and scaling means operatively connected to said analyzing means and said memory means for scale-transforming the operational coefficients of the operating elements in accordance with said operational block information and said scale factors and for revising said operational block information, said revised operational block information being stored in said memory means.

2. A control system according to claim 1, wherein said analyzing means comprises calculating means for calculating approximate solutions for each variable for every predetermined time width $\Delta t$ up to an approximate degree $m$ of the equation, and means for determining a maximum value for each of said variables from said approximate solutions.

3. A control system according to claim 2, wherein said calculating means comprises variable memory means for storing a calculated result of each of said variables up to a degree lower than a predetermined degree, coefficient memory means for storing an input coefficient of each operating element as well as said predetermined degree to be next calculated and said time width, variable calculating means for calculating each of said variable of said predetermined degree from said calculated result of said lower degree and from said input coefficient as well as said predetermined degree and said time width, and adding means for adding the calculated result of said predetermined degree to said calculated result of said lower degree and for supplying a result of the addition to said variable memory means for storage therein.

4. A control system according to claim 2, wherein said calculating means comprises means for generating a series of timing signals, first storage means for storing a calculated result of each of said variables up to a degree lower than a predetermined degree, second storage means for storing an input coefficient of each operating element as well as said predetermined degree to be next calculated and said time width, gating means responsive to said timing signals for outputting the contents of the first and second storage means, first multiplying means for multiplying said calculated result of said lower degree and said input coefficient, means for dividing said time width by said predetermined degree, second multiplying means for multiplying a result of the multiplication and a result of the division, and means for adding a result of the last-mentioned multiplication to said calculated result of said lower degree.

5. A control system according to claim 1, wherein said scaling means comprises means for generating a series of timing signals, means for reading out from said memory means said operational block information and said scale factor for every input coefficient of each operating element, means for storing the read-out information, means for conducting scaling for each input coefficient in accordance with the stored information, means for transmitting a result of said scaling to said memory means, and gating means responsive to said timing signals for delivering information to and receiving information from said respective means.

6. In an analog computing apparatus wherein a plurality of operating elements are combined in predetermined operational blocks in dependence on an original differential equation and wherein an input coefficient, initial value and forcible term are set by the use of a scale factor, an automatic scaling system comprising means for calculating solutions of an approximate equation for each variable of said original differential equation, and means for obtaining the scale factor $\beta = 1/R$ from a value $R$ which is larger than a maximum value of the solutions of said approximate equation.

7. An automatic scaling system according to claim 6, wherein said approximate equation is one of:

1. $y_i(t_0 + \Delta t) = y_i^{(0)} + \Delta t\, y_i^{(1)} + (\Delta t^2/2!)\, y_i^{(2)} + (\Delta t^3/3!)\, y_i^{(3)} + \ldots + (\Delta t^m/m!)\, y_i^{(m)}$ ;

2. $y_3(t_0 + \Delta t) = y_1^{(0)} y_2^{(0)} + \Delta t(y_1^{(0)} y_2^{(1)} + y_2^{(0)} y_1^{(1)}) + (\Delta t^2/2!)(y_1^{(0)} y_2^{(2)} + 2y_1^{(1)} y_2^{(1)} + y_2^{(0)} y_1^{(2)}) + (\Delta t^3/3![3(y_1^{(1)} y_2^{(2)} + y_2^{(1)} y_1^{(2)}) + y_1^{(0)} y_2^{(3)} + y_2^{(0)} y_1^{(3)}] + \ldots;$ 3. $y_3(t_0 + \Delta t) = y_1^{(0)} \cdot (1/y2^{(0)}) + \Delta t (1/Y2^{(0)})^2 (y_2^{(0)} y_1^{(1)} - y_i^{(0)} y_2^{(1)}) + (\Delta t^2/2!)(1/y2^{(0)})^3 [(y_2^{(0)})^2 y_1^{(2)} - 2y_1^{(0)}(y_2^{(1)})^2 - 2y_2^{(0)} y_1^{(1)} y_2^{(1)} - y_1^{(0)} y_2^{(0)} y_2^{(2)}] + \ldots;$ and 4. $\sin y_1(t_0 + \Delta t) = K_0 (y_1^{(0)} + \Delta t y_1^{(1)} + (\Delta t^2/2!) y_1^{(2)} + \ldots) + K_1 (y_1^{(0)} + \Delta^t v_1^{(1)} + (\Delta t^2/2!) y_1^{(2)} + \ldots)^3 \cdot K_2 (y_1^{(0)} + \Delta t y_1^{(1)} + (\Delta t^2/2!) y_1^{(2)} + \ldots)^5 + \ldots;$ where
$y_i^{(0)} = y_i(t_0)$
$y_i^{(m)} = f_i(y_1^{(m-1)}1), y2^{(m-1)}, \ldots, y_n^{(m-1)}).$ 8. In analog computing apparatus wherein a plurality of operating elements are combined in predetermined operational blocks in dependence upon an original differential equation and wherein an input coefficient, initial value and forcible term are set by the use of a scale factor $\beta$, an automatic scaling system which comprises means for determining a maximum value Q from solutions of the $m$-th degree approximate equation for each variable of said original differential equation at $(t_0 + K\Delta t)$ (where $m$ and $K$ are finite values), and means for determining the scale factor $\beta = 1/R$ from a value $R$ which is larger than said maximum value Q.

9. An automatic scaling system according to claim 8, wherein said value R is set so as to provide a relationship of $\frac{1}{2} < Q/R < 1$.

10. An automatic scaling system according to claim 6, wherein said approximate equation is
$y_i(t_0 + \Delta t) = y_i^{(0)} + \Delta t y_i^{(1)} + (\Delta t^2/2!) y_i^{(2)} + (\Delta t^3/3!) y_i^{(3)} + \ldots + (\Delta t^m/m!) y_i^{(m)}$
where
$y_i^{(0)} = y_i(t_0)$
$y_i^{(m)} = f_i(y_1^{(m-1)}, y_2^{(m-1)}, \ldots, y_n^{(m-1)}).$

* * * * *